(12) United States Patent
Maehara et al.

(10) Patent No.: US 7,098,628 B2
(45) Date of Patent: Aug. 29, 2006

(54) GENERATION CONTROL SYSTEM

(75) Inventors: Fuyuki Maehara, Nagoya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 21 days.

(21) Appl. No.: 11/007,262

(22) Filed: Dec. 9, 2004

(65) Prior Publication Data
US 2005/0140342 A1 Jun. 30, 2005

(30) Foreign Application Priority Data
Dec. 25, 2003 (JP) ............... 2003-429089

(51) Int. Cl.
H02H 7/06 (2006.01)
H02P 11/00 (2006.01)
H02P 9/00 (2006.01)

(52) U.S. Cl. .................. 322/24; 322/28

(58) Field of Classification Search ............ 322/36, 322/24, 26, 28; 290/40 C
See application file for complete search history.

(56) References Cited

U.S. PATENT DOCUMENTS

| 4,672,287 | A | * | 6/1987 | Fujioka et al. ............ 318/806 |
| 4,877,273 | A | * | 10/1989 | Wazaki et al. ............ 290/40 C |
| 5,086,266 | A | * | 2/1992 | Shiga et al. ............ 322/28 |
| 5,231,344 | A | * | 7/1993 | Marumoto et al. ............ 322/14 |
| 5,256,959 | A | * | 10/1993 | Nagano et al. ............ 322/25 |
| 6,965,173 | B1 | * | 11/2005 | Fukasaku et al. ............ 290/40 C |
| 6,975,080 | B1 | * | 12/2005 | Kitamura et al. ............ 318/109 |
| 2006/0012322 | A1 | * | 1/2006 | Matsumoto et al. ............ 318/432 |

FOREIGN PATENT DOCUMENTS

JP 355053191 A * 4/1980
JP A 6-90532 3/1994

* cited by examiner

Primary Examiner—Julio Gonzalez Ramirez
(74) Attorney, Agent, or Firm—Oliff & Berridge, PLC

(57) ABSTRACT

A generation control system for a vehicle includes an ac generator, a field current control unit that controls the duty ratio of field current of the ac generator, a field current detector, a load current detector, a generator rotation speed detector, a driving-torque-increase calculator that calculates a predicted increase in driving torque of the ac generator from increase in the current supplied to an electric load. The driving-torque-increase calculator includes first output current calculator that calculates present output current of the ac generator from the generator's rotation speed and the field current and second output current calculator that calculates predicted output current of the ac generator from the first output current and the increase in the current supplied to the electric load. A predicted increase in driving torque of the ac generator is calculated from a difference between the present driving torque and a driving torque that corresponds to the predicted output current.

11 Claims, 4 Drawing Sheets

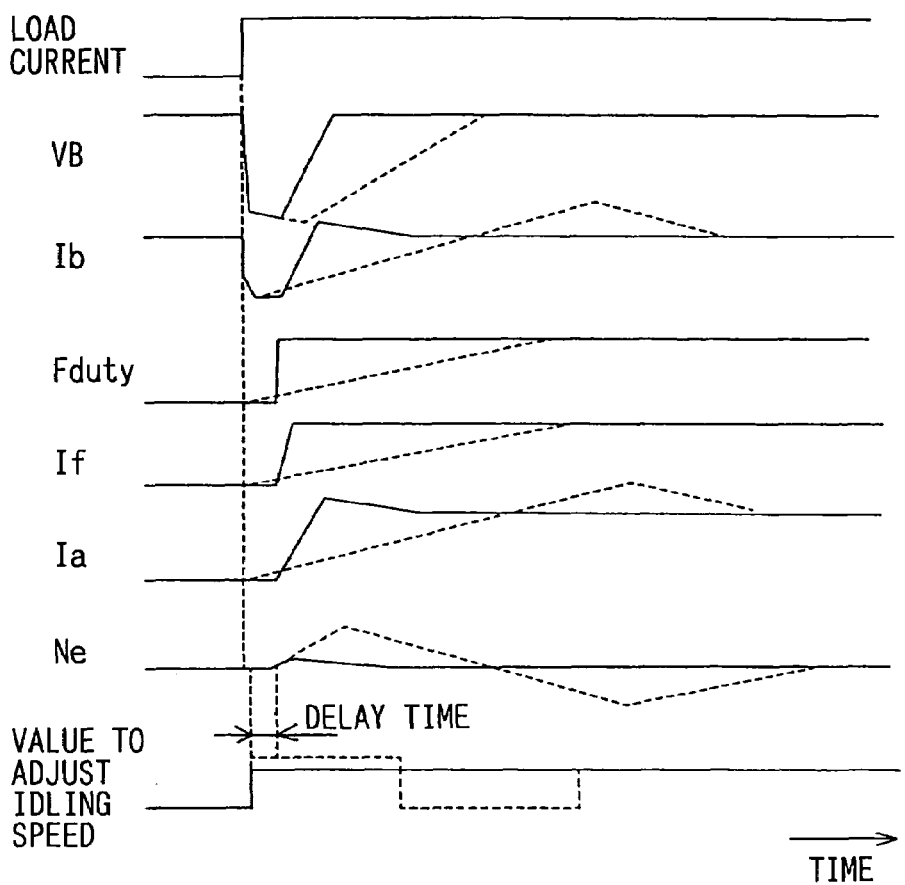
FIG. 5A  LOAD CURRENT
FIG. 5B  VB
FIG. 5C  Ib
FIG. 5D  Fduty
FIG. 5E  If
FIG. 5F  Ia
FIG. 5G  Ne
FIG. 5H  VALUE TO ADJUST IDLING SPEED
DELAY TIME
TIME
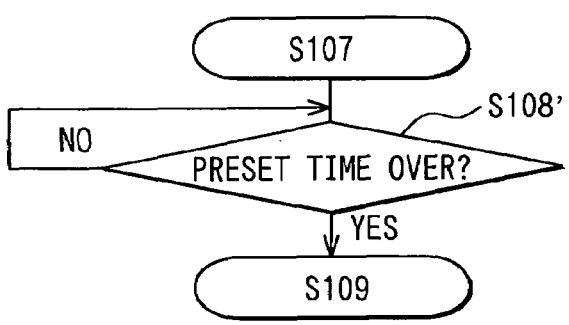
FIG. 6
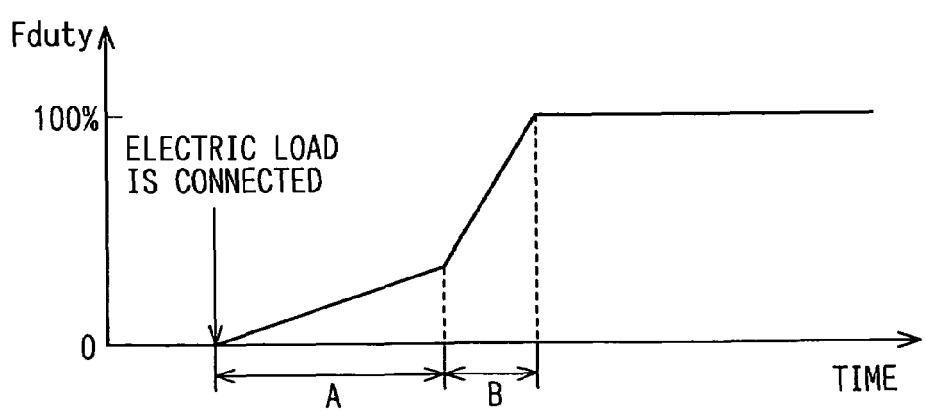
FIG. 7

GENERATION CONTROL SYSTEM

CROSS REFERENCE TO RELATED APPLICATION

The present application is based on and claims priority from Japanese Patent Application 2003-429089, filed Dec. 25, 2003, the contents of which are incorporated herein by reference.

BACKGROUND OF THE INVENTION

1. Field of the Invention

The present invention relates to a generation control system that includes a means for calculating an increase in driving torque of a generator that is necessary to stabilize engine rotation speed when an electric load is connected to the generator.

2. Description of the Related Art

If a large electric load is connected to a vehicle ac generator while an engine is running at a lower rotation speed, the driving torque of the ac generator so abruptly increases that the engine may stall due to an excessive amount of torque increase.

JP-A-Hei 6-90532 discloses a generation control system by which field current is gradually increased when an electric load is connected to a generator, thereby preventing engine from stalling.

JP-B2 Hei 7-116960 or its counterpart U.S. Pat. No. 4,877,273 discloses a generation control system by which an engine idling speed is controlled according to current supplied to the electric load and field current when an electric load is connected to a generator.

In the generation control system disclosed in JP-A-Hei 6-90532, an increase in torque to drive the generator due to connection of load is not taken into account. Therefore, time for gradually increasing field current becomes comparatively longer, as indicated by a dotted line in FIG. 5E. Therefore, battery voltage lowers, as shown in FIG. 5B by a dotted line and lamps or other illuminating elements may flicker.

In the generation control system disclosed in JP-B2 Hei 7-116960, a change in the driving torque of the ac generator due to the idling speed and temperature of the ac generator is taken into account when the engine idling speed is controlled to a suitable speed. After the engine idling speed control is started, the engine rotation speed fluctuates as indicated by a dotted line in FIG. 5G This fluctuation may discomfort a driver and a passenger of a vehicle in which an ac generator is mounted.

SUMMARY OF THE INVENTION

Therefore, it is an object of the invention to provide an improved generation control system that is free from the above problems.

Another object of the invention is to provide a generation control system that includes means for calculating a suitable value to increase driving torque when an electric load is connected to a generator.

According to a feature of the invention, a generation control system for a vehicle having a battery including an ac generator driven by an internal combustion engine, field current control means for controlling the duty ratio of field current of the ac generator, field current detecting means, load current detecting means, generator rotation speed detecting means, driving-torque-increase calculating means that calculates a predicted increase in driving torque of the ac generator based on an increase in the current supplied to an electric load. The driving-torque-increase calculating means includes first output current calculating means that calculates present output current of the ac generator as first output current from the generator's rotation speed and the field current and second output current calculating means for calculating predicted output current of the ac generator as second output current from the first output current and the increase in the current supplied to the electric load. In the above system, a predicted increase in driving torque of the ac generator is calculated from a difference between a driving torque that corresponds to the first output current and a driving torque that corresponds to the second output current.

In the generation control system as described above, the load current detecting means detects current supplied to the electric load from the battery. In this system, the driving-torque-increase calculating means may include a map that stores correlative data of the output current of the ac generator and the rotation speed of the engine. Further, maximum field current is obtained from the map based on the field current and the duty ratio of the field current, output current of the ac generator that corresponds to the maximum field current is obtained from the map as maximum output current, and a difference between driving torque that corresponds to the first output current and driving torque that corresponds to the maximum output current is calculated as a predicted increase in the driving torque if the second output current is larger than the maximum output current.

Moreover, the field current control means controls increase ratio of the field current according to the predicted increase of the driving torque. In this system, the field current control means limits an increase rate of the field current within a predetermined value if the predicted increase in driving torque is larger than a predetermined value. This control system may further include an engine power adjusting means which adjusts engine power according to the predicted increase in the driving torque, so that the field current control means keeps limiting an increase rate of the field current until the engine rotation speed increases and becomes as high as a predetermined speed after the engine power is adjusted. On the other hand, field current control means may keep limiting an increase rate of the field current until a preset time passes after the engine power is adjusted. The field current control means may increase the increase rate of the field current after the engine rotation speed increases and becomes as high as a predetermined speed. On the other hand, the field current control means may increase the increase rate of the field current after a preset time has passed.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 5A–5H illustrate the timing of various signals of the generation control system when an electric load is connected to the ac generator;

FIG. 6 is a portion of a flow diagram showing control operation of a generation control system according to the second embodiment of the invention; and FIG. 7 is a timing diagram of the operation of a generation control system according to the third embodiment of the invention.

DETAILED DESCRIPTION OF THE PREFERRED EMBODIMENTS

Some preferred embodiments according to the invention will be described with reference to the appended drawings.

Figure 1:
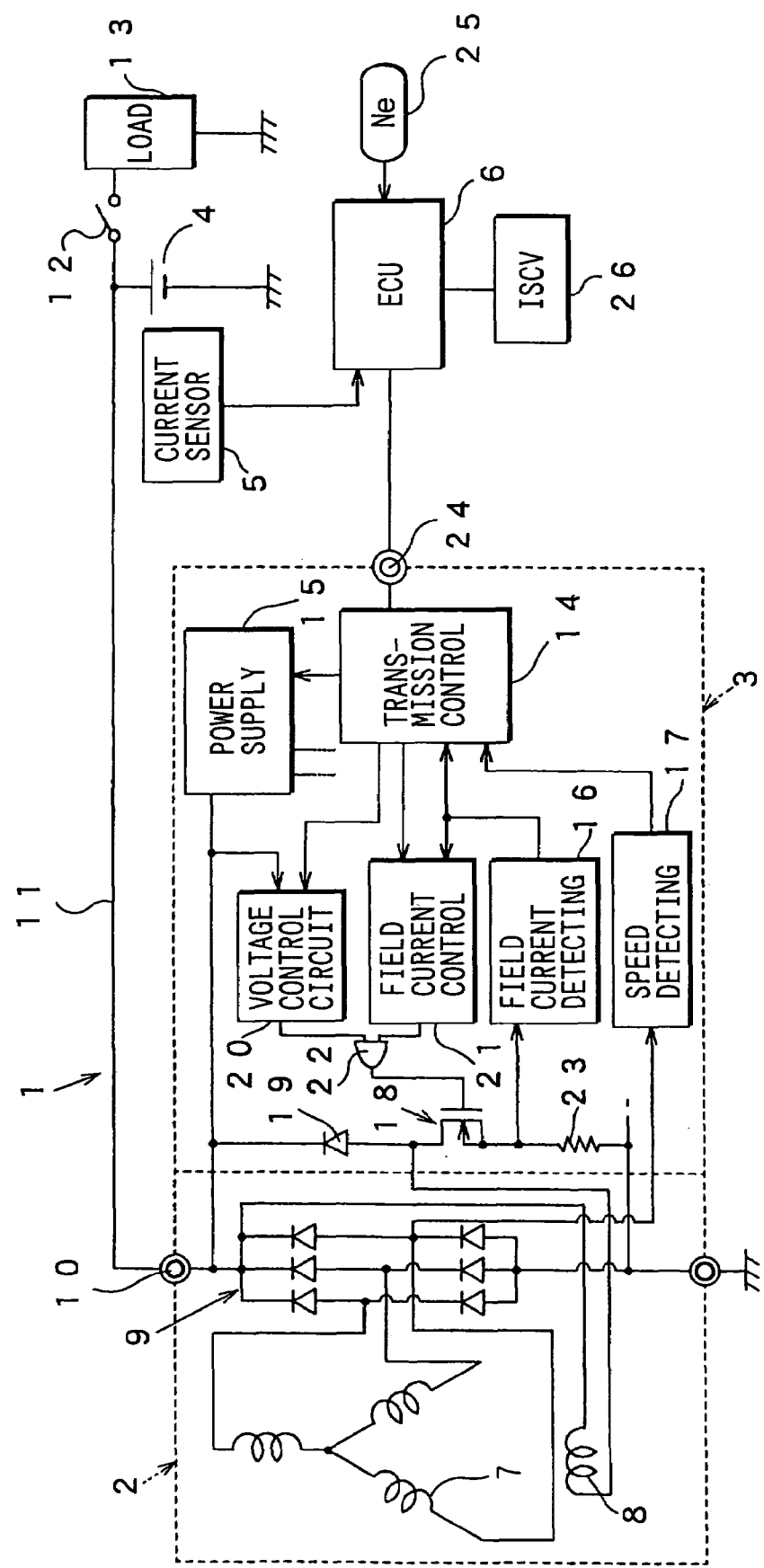
FIG. 1 is a block diagram illustrating a generation control system according to the first embodiment of the invention.

A generation control system for a vehicle according to the first embodiment of the invention will be described with reference to FIGS. 1–5. As shown in FIG. 1, the generation control system 1 includes an ac generator 2, a voltage regulator 3, a battery 4, a battery discharge current sensor 5, an engine control unit (ECU) 6, etc.

The ac generator 2 includes an armature winding 7, a field coil 8, a three-phase full-wave rectifier circuit 9, an output terminal 10, etc. and is connected to the positive terminal of the battery 4 by an electric supply line 11 and to an electric load 13 via a switch 12.

The armature winding 7 is a Y-connected winding that has three phase windings disposed in a stator core at 120° in electric angle different from each other. The field coil 8 generates a magnetic field interlinking the armature winding 7 to induce prescribed voltage in the armature winding 7 when field current is supplied thereto. The three-phase full-wave rectifier circuit 9 converts three-phase ac output power of the armature winding 7 to dc power.

The regulator 3 includes a signal transmission control circuit 14, a power supply circuit 15, a field current detecting circuit 16, a rotation speed detecting circuit 17, a switching element 18, a flywheel diode 19, a voltage control circuit 20, a field current control circuit 21, an AND circuit 22 etc. The regulator 3 regulates the output voltage of the ac generator 2 to a regulation voltage Vr. The switching element 18, the flywheel diode 19, the voltage control circuit 20, the field current control circuit 21 and the AND circuit 22 form a field current control unit.

The signal transmission control circuit 14 is connected to the ECU 6 via a LAN to exchange signals therewith in a serial communication mode. The signal transmission control circuit 14 sends the ECU 6 data signals of the field current and the rotation speed of the ac generator when requested by the ECU 6. The power supply circuit 15 supplies electric power to various circuits of the voltage regulator 6 when it receives a turn-on signal from the signal transmission control circuit 14. The field current detecting circuit 16 sends a signal to the signal transmission control circuit 14 and the field current control circuit 21 when it detects a voltage drop by the field current across sensing resistor 23 that is connected in series with the source terminal of the switching element 18. The rotation speed detecting circuit 17 sends the transmission control circuit 14 a signal of the frequency of the voltage induced in one of the phase-windings, which is proportional to the rotation speed of the ac generator 2.

The ECU 6 includes a driving-torque-increase calculating circuit and an engine power adjusting unit. The driving-torque-increase calculating circuit detects an amount of load current supplied to the electric load 13 when the electric load 13 is connected and calculates a predicted increase of the driving torque when the load current increases. The engine power adjusting unit, which is represented by an idling speed control valve (ISCV) 26, adjusts the engine power according to the predicted increase of the driving torque.

When a well-known key switch (not shown) is turned on, the ECU 6 sends a start signal to a terminal 24 of the regulator 24 that is directly connected to the transmission control circuit 14. When the transmission control circuit 14 receives the start signal, it sends a turn-on signal to the power supply circuit 15 to make the whole regulator 3 operate. Thereafter, the ECU 6 sends a signal of the regulation voltage Vr.

If no electric load or a very small electric load 13 is connected to the ac generator 2 when an engine fully starts and the rotation speed of the engine becomes a prescribed speed level, the output voltage of the ac generator 2 is regulated to the regulation voltage Vr. In this case, the output voltage of the ac generator is regulated by the voltage control circuit 20. When the output voltage of the ac generator 2 and the signal of the regulation voltage Vr are sent to the voltage control circuit 20, it compares the output voltage and the regulation voltage Vr and provides a duty ratio signal having a duty ratio that corresponds to the difference between the output voltage and the regulation voltage Vr. The duty ratio signal is sent to the switching element 18 via the AND circuit 22 to turn on or off the switching element 18 to supply a suitable amount of field current to the field coil 8. Thus, the output voltage of the ac generator 2 is regulated to the regulation voltage Vr.

Figure 2:
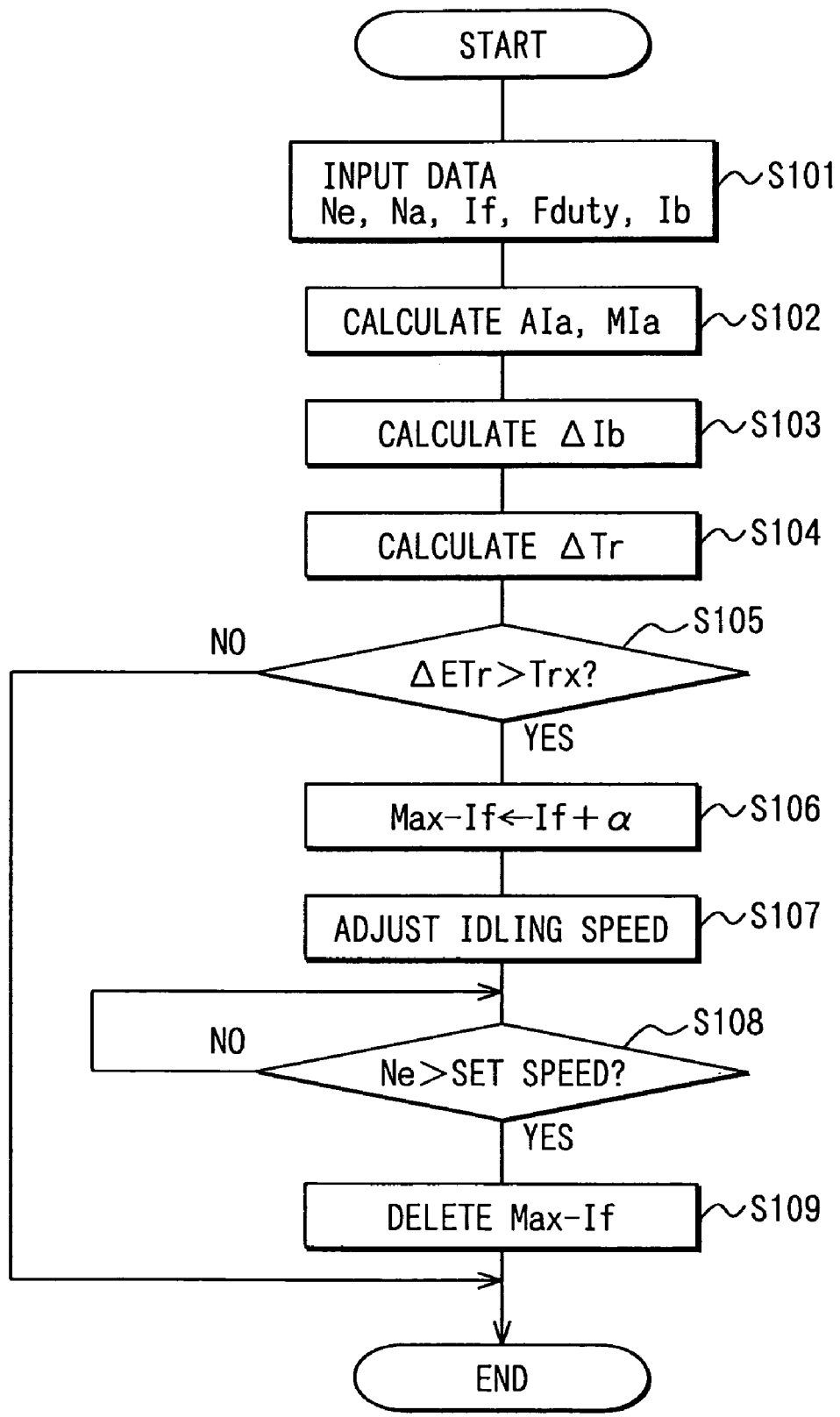
FIG. 2 is a flow diagram showing control operation of the generation control system according to the first embodiment.

If a large electric load 13 is connected to the ac generator, the voltage regulator 3 operates as illustrated in a flow diagram shown in FIG. 2.

At step 101, data that include field current If, a duty ratio Fduty of the duty ratio signal, a rotation speed Na of the ac generator 2, battery charging current Ib, an engine rotation speed Ne, etc. are inputted into the ECU 6. A pulley ratio of a pulley of the ac generator 2 to a pulley of a crankshaft, which is Na/Ne, is calculated from the rotation speed Na of the ac generator 2 and the rotation speed Ne of the engine.

Figure 3:
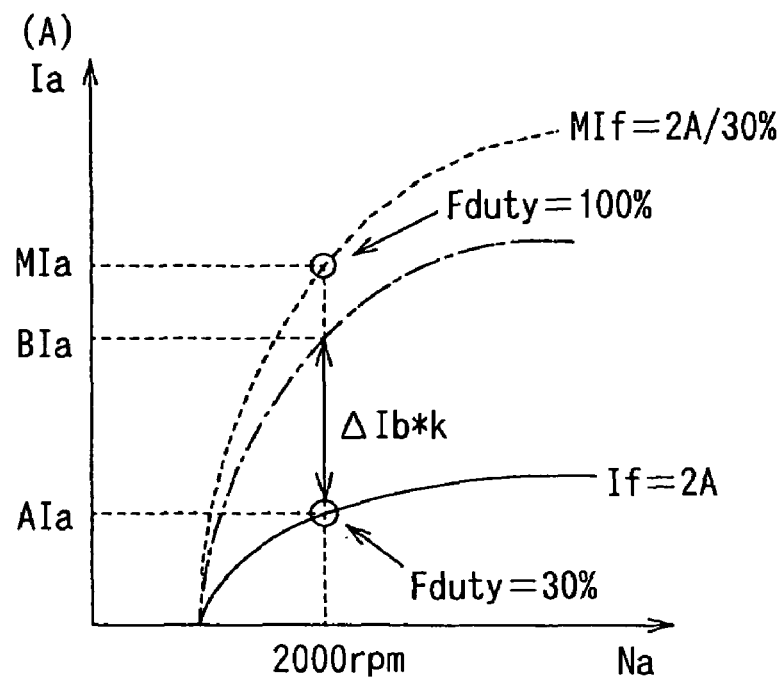
FIG. 3 is a graph showing a relationship between the rotation speed of an ac generator and the output current thereof.

At step 102, present output current AIa and a maximum output current MIa of the ac generator 2 are calculated from the rotation speed of the generator 2 and the field current If. For this purpose, the ECU 6 has a map A that stores correlative data of the output current Ia corresponding to the field current If and the rotation speed Na of the ac generator, as shown in FIG. 3. Maximum field current MIf=If/Fduty is calculated from the field current If and the duty ratio Fduty, and Maximum output current of the ac generator 2 MIa, which corresponds to the maximum field current MIf is obtained from the map A.

At step 103, a present value of the battery charging current Ib and a previous value of the battery charging current Ib are compared to obtain a difference or an increase ΔIb. Incidentally, the output current of the ac generator 2 increases at a fixed rate that corresponds to the time constant of the field coil If when the electric load 13 is connected.

At step 104, a predicted increase ΔTr of the generator driving torque is calculated. At first, a predicted amount of the output current BIa of the ac generator 2 is obtained from the map A with use of the increase ΔIb in charging current. Incidentally, ΔIb is replaced by ΔIb*K (K is a correction constant) because the output current includes the battery charging current in addition to the increase ΔIb. The correction constant K varies as the regulation voltage Vr changes.

Figure 4:
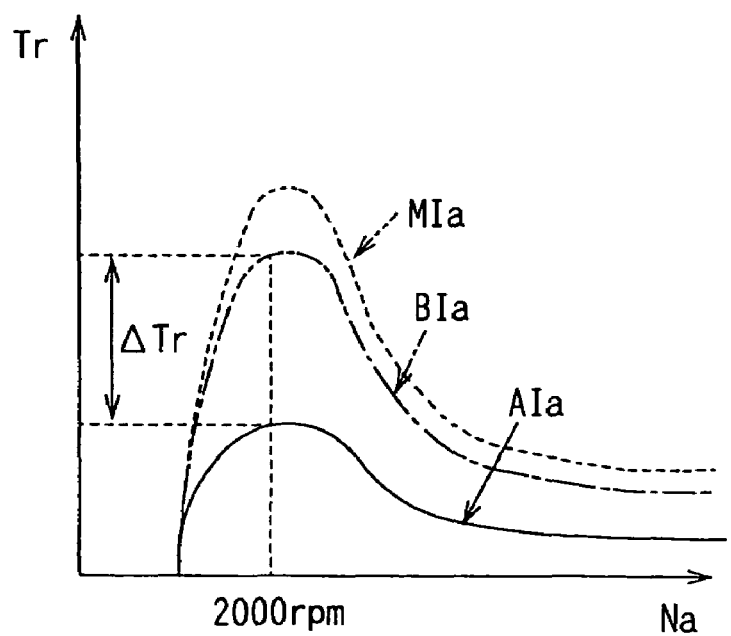
FIG. 4 is a graph showing a relationship between the rotation speed of the ac generator and the driving torque thereof.

Then, a difference (or an increase) ΔTr between a driving torque that corresponds to a present amount AIa of the output current of the ac generator 2 and a driving torque that corresponds to a predicted amount BIa of the output current of the generator 2 is obtained from a Map B shown in FIG. 4. If the predicted amount BIa of the output current becomes larger than the maximum amount MIa of the output current, the amount BIa is replaced by the maximum amount MIa.

At step 105, the predicted increase ΔTr is multiplied by the pulley ratio Na/Ne to obtain an engine torque increase ΔETr, which is compared with a predetermined value Trx. If ΔETr≦Trx and the result of step 105 is No, it is presumed that a prescribed electric load 13 has not been connected. Consequently, the control operation of the voltage regulator ends. On the other hand, it is presumed that a prescribed electric load 13 has been connected and step 106 follows if ΔETr>Trx and the result of step 105 is YES.

At step 106, a maximum value Max-If of the field current is set by adding α to the field current If, which is sent to the regulator 3. The field current control circuit 21 of the regulator 3 compares the maximum value (If+α) of the field current with measured value of the field current If that is measured by the field current detecting circuit 16 and sends the switching element 18 a duty ratio signal Fduty through the AND circuit 22 to control the field current If to be lower than the maximum value, as shown in FIG. 5D. Accordingly, the output current Ia is controlled not to increase the driving torque of the generator, as shown in FIG. 5F.

At step 107, an adjusting value to adjust idling speed is set according to the engine torque increase ΔETr. The ECU 6 controls the ISCV 26 to regulate the idling speed of the engine with the adjusting value, as shown in FIG. 5H. Incidentally, the ISCV 26 controls the amount of air that flows through a bypass of an engine throttle valve. In case of an electronically controlled throttle system in which the throttle valve is driven by a motor, the throttle open angle is controlled according to the adjusting value of the idling speed control.

As shown in FIG. 5G the engine speed increases after a delay time of about 300 milliseconds.

At step 108, whether the engine rotation speed Ne is higher than a set speed or not is examined. If the engine rotation speed Ne is as high as or lower than the set speed (NO), the field current increase is kept to be limited, so that the idling speed is controlled to suppress increase in the driving torque. On the other hand, step 109 follows if the engine rotation speed Ne is higher than the set speed (YES).

At step 109, the Max-If is deleted to cancel the gradual increase of the field current so that the regulator 3 can return to the normal operation, in which the output current Ia of the ac generator can normally increase. Thus, the reduction in the fluctuation of the engine idling speed can be improved from the dotted line to the solid line as shown in FIG. 5H, and the control of the battery voltage Vb can be improved from the dotted line to the solid line as shown in FIG. 5B.

A generation control system according to the second embodiment of the invention will be described with reference to FIG. 6. The control of this generation control system is only different from the control of the first embodiment in that the step 108 shown in FIG. 2 is replaced by a step 108', in which a preset time is measured by a timer of the ECU 6.

At the step 108', whether or not the preset time has passed after the gradual increase control of the field current is examined. If the result is NO, the gradual increase control is continued. If the result is YES, the next step follows as the first embodiment, in which the Max-If is deleted to cancel the gradual increase of the field current so that the regulator 3 can return to the normal operation.

A generation control system according to the third embodiment of the invention will be described with reference to FIG. 7.

The control of this embodiment is the almost the same except that the duty ratio Fduty is changed with time period as shown in FIG. 7. That is, the increase rate of the field current in time period A is set smaller than the increase rate of the field current in time period B. Accordingly, the fluctuation of the engine rotation speed can be more smoothly reduced.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generation control system for a vehicle having a battery comprising:
   an ac generator driven by an internal combustion engine;
   field current control means for controlling the duty ratio of field current of the ac generator;
   field current detecting means for detecting the field current;
   load current detecting means for detecting current supplied to an electric load of a vehicle;
   rotation speed detecting means for detecting rotation speed of the ac generator;
   driving-torque-increase calculating means for calculating a predicted increase in driving torque of the ac generator from increase in the current supplied to an electric load;
   wherein said driving-torque-increase calculating means comprises:
   first output current calculating means for calculating present output current of the ac generator as first output current from the generator's rotation speed and the field current;
   second output current calculating means for calculating predicted output current of the ac generator as second output current from the first output current and the increase in the current supplied to the electric load;
   a predicted increase in driving torque of the ac generator is calculated from a difference between a driving torque that corresponds to the first output current and driving torque that corresponds to the second output current,
   said driving-torque-increase calculating means includes a map that stores correlative data of the output current of the ac generator and the rotation speed of the ac generator;
   maximum field current is obtained from the map based on the field current and the duty ratio of the field current;
   output current of the ac generator that corresponds to the maximum field current is obtained from the map as maximum output current; and
   a different between driving torque that corresponds to the first output current and driving torque that corresponds to the maximum output current is calculated as a predicted increase in the driving torque if the second output current is larger than the maximum output current.

2. The generation control system as claimed in claim 1, wherein said load current detecting means detects current supplied to the electric load from the battery.

3. The generation control system as claimed in claim 1, wherein said field current control means controls increase ratio of the field current according to the predicted increase of the driving torque.

4. The generation control system as claimed in claim 3, wherein said field current control means limits an increase rate of the field current within a predetermined value if the predicted increase in driving torque is larger than a predetermined value.

5. The generation control system as claimed in claim 4, further comprising an engine power adjusting means for adjusting engine power according to the predicted increase in the driving torque, wherein said field current control means keeps limiting an increase rate of the field current until the engine rotation speed increases and becomes as high as a predetermined speed after the engine power is adjusted.

6. The generation control system as claimed in claim 4, further comprising an engine power adjusting means for adjusting engine power according to the predicted increase in the driving torque, wherein said field current control means keeps limiting an increase rate of the field current until a preset time passes after the engine power is adjusted.

7. The generation control system as claimed in claim 5, said field current control means increases the increase rate of the field current after the engine rotation speed increases and becomes as high as a predetermined speed.

8. The generation control system as claimed in claim 6, said field current control means increases the increase rate of the field current after a preset time has passed.

9. The generation control system as claimed in claim 7, wherein said engine power adjusting means comprises an engine idling speed control valve.

10. The generation control system as claimed in claim 1, wherein said field current control means, said field current detecting means and said rotation speed detecting means form a voltage regulator for regulating output voltage of the ac generator.

11. The generation control system as claimed in claim 6, said driving-torque-increase adjusting means and said engine power adjusting means form an engine control unit.

* * * * *